(12) United States Patent
Takagi et al.

(10) Patent No.: US 9,048,567 B2
(45) Date of Patent: Jun. 2, 2015

(54) CONNECTOR HAVING A REGULATING PORTION RECEIVED IN A REGULATED PORTION ALONG A PREDETERMINED DIRECTION

(75) Inventors: Yohei Takagi, Tokyo (JP); Yoshiro Otsuka, Tokyo (JP); Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/981,128

(22) PCT Filed: Dec. 28, 2011

(86) PCT No.: PCT/JP2011/080385
§ 371 (c)(1),
(2), (4) Date: Jul. 23, 2013

(87) PCT Pub. No.: WO2012/101952
PCT Pub. Date: Aug. 2, 2012

(65) Prior Publication Data
US 2013/0303014 A1    Nov. 14, 2013

(30) Foreign Application Priority Data

Jan. 27, 2011  (JP) ................................. 2011-014781

(51) Int. Cl.
*H01R 13/627* (2006.01)
*H01R 13/62* (2006.01)
(Continued)

(52) U.S. Cl.
CPC ............ *H01R 13/62* (2013.01); *H01R 13/6275* (2013.01); *B60L 11/1818* (2013.01);
(Continued)

(58) Field of Classification Search
CPC .................................................. H01R 13/6275
USPC ........................................................ 439/350
See application file for complete search history.

(56) References Cited

U.S. PATENT DOCUMENTS 5,350,312 A * 9/1994 Kuno et al. .................... 439/310
5,417,579 A * 5/1995 Yoshioka et al. .............. 439/310
(Continued)

FOREIGN PATENT DOCUMENTS

EP        0 646 995 A2    4/1995
JP        H05-288793 A    11/1993
(Continued)

OTHER PUBLICATIONS

International Search Report of PCT/JP2011/080385, Mar. 27, 2012.
(Continued)

*Primary Examiner* — Abdullah Riyami
*Assistant Examiner* — Justin Kratt
(74) *Attorney, Agent, or Firm* — Collard & Roe, P.C.

(57) ABSTRACT

A connector capable of being fitted to a partner connector is provided with a lock member, a solenoid having a plunger, a restriction member having a restricting part, and a restricted part. In a fitted state in which the connector and the partner connector are fitted to each other, the lock member engages the partner connector and locks the two connectors into a fitted state. The solenoid drives the plunger between a restriction position and a release position. The restriction member is movably supported by the plunger. The restricted part receives the restricting part when the plunger is driven into the restriction position. When the plunger is in the restriction position, movement of the restricted part is restricted by the restricting part, and thereby the restricted part directly or indirectly prevents release of the fitted state.

11 Claims, 7 Drawing Sheets

(51) Int. Cl.
*B60L 11/18* (2006.01)
*H01R 13/639* (2006.01)
*H01R 13/66* (2006.01)

(52) U.S. Cl.
CPC .......... *B60L2270/32* (2013.01); *B60L 2270/34* (2013.01); *Y02T 10/7005* (2013.01); *Y02T 90/14* (2013.01); *H01R 13/6397* (2013.01); *H01R 2201/26* (2013.01); *H01R 13/6633* (2013.01)

(56) References Cited

U.S. PATENT DOCUMENTS

| | | | |
|---|---|---|---|
| 5,498,966 | A | 3/1996 | Yamamoto |
| 5,536,173 | A * | 7/1996 | Fujitani et al. ................. 439/34 |
| 5,545,049 | A | 8/1996 | Hasegawa et al. |
| 5,584,712 | A * | 12/1996 | Fukushima ................... 439/141 |
| 6,638,113 | B2 | 10/2003 | Kajiwara et al. |
| 2010/0228405 | A1 * | 9/2010 | Morgal et al. ..................... 701/2 |

FOREIGN PATENT DOCUMENTS

| | | |
|---|---|---|
| JP | H06-188044 A | 7/1994 |
| JP | H06-310207 A | 11/1994 |
| JP | H07-037644 A | 2/1995 |
| JP | H07-085926 A | 3/1995 |
| JP | H09-106861 A | 4/1997 |
| JP | 2002-198146 A | 7/2002 |
| JP | 2011-238532 A | 11/2011 |
| JP | 2011-243343 A | 12/2011 |

OTHER PUBLICATIONS

Extended European Search Report in EP 11 85 7409, dated Oct. 17, 2014.

* cited by examiner

CONNECTOR HAVING A REGULATING PORTION RECEIVED IN A REGULATED PORTION ALONG A PREDETERMINED DIRECTION

CROSS REFERENCE TO RELATED APPLICATIONS

This application is the National Stage of PCT/JP2011/080385 filed on Dec. 28, 2011, which claims priority under 35 U.S.C. §119 of Japanese Application No. 2011-014781 filed on Jan. 27, 2011, the disclosures of which are incorporated by reference. The international application under PCT article 21(2) was not published in English.

TECHNICAL FIELD

This invention relates to a connector which is used to supply electric power, for example, to an electric car.

BACKGROUND ART

A connector, which is used to supply electric power, is provided with a power pin or a power contact for supplying high electric current. While the electric power is supplied, high electric current flows from the connector to a mating connector, which is mated with the connector, through the power pin or the power contact. It is very dangerous if a mated state, where the connector and the mating connector are mated with each other, is released while the electric power is supplied. Therefore, this type of connectors is generally provided with a structure which prevents the mated state from being released when the electric power is supplied.

For example, the connector provided with the aforementioned structure is disclosed in Patent Document 1 or Patent Document 2, contents of which are incorporated herein by reference. The connector of Patent Document 1 comprises a push-type solenoid which has an electric coil and a plunger driven by the electric coil. The connector further comprises an operation lever operable to release the mated state. The operation lever is formed with a hole. While the electric power is supplied, the electric coil drives the plunger so that the plunger protrudes by a predetermined amount. While the electric power is supplied, the protruding part of the plunger is inserted in the hole of the operation lever so that the operation lever is prevented from being operated. The connector of Patent Document 2 comprises a push-type solenoid similar to the push-type solenoid of Patent Document 1, and a release lever which is formed with a hole. While the electric power is supplied, the plunger is inserted in the hole of the release lever to prevent the release lever from being moved so that the mated state is prevented from being unintentionally released.

PRIOR ART DOCUMENTS

Patent Document(s)

Patent Document 1: JP A H6 (1994)-188044
Patent Document 2: JP A H7 (1995)-85926

SUMMARY OF INVENTION

Technical Problem

In order to securely prevent the lever (the operation lever or the release lever) from being operated or moved, it is necessary to adjust the shape and the size of the hole formed in the lever nearly equal to the shape and the size of the plunger. Otherwise, the lever may be shaky when the plunger is inserted in the hole.

However, if the shape and the size of the hole of the lever are nearly equal to the shape and the size of the plunger, the hole should be accurately aligned with the plunger. If the location of the hole is slightly apart from the plunger, the plunger may not be inserted into the hole when the solenoid drives the plunger. Accordingly, even when the electric power is supplied, the mated state of the connectors may not be properly locked.

It is therefore an object of the present invention to provide a connector configured to more securely lock the mated state of the connector with a mating connector.

Solution to Problem

One aspect of the present invention provides a connector mateable with a mating connector. The connector comprises a lock member, a solenoid, a regulating member and a regulated portion. The lock member is configured to engage the mating connector under a mated state where the connector and the mating connector are mated with each other, wherein an engagement of the lock member locks the mated state. The solenoid has a plunger. The solenoid is configured to drive the plunger between a regulating position and a release position along a predetermined direction. The regulating member has a regulating portion extending in an intersecting direction which intersects with the predetermined direction. The regulating member is supported by the plunger so as to be moved by the plunger. The regulated portion is configured to receive the regulating portion along the predetermined direction when the plunger is driven from the release position to the regulating position. A movement of the regulated portion is regulated by the regulating portion when the plunger is located at the regulating position so that the regulated portion directly or indirectly prevents the mated state from being unlocked.

Advantageous Effects of Invention

As for the connector according to the present invention, the regulating portion, which extends in a direction (intersecting direction) intersecting with the predetermined direction, is received in the regulated portion along the predetermined direction. Accordingly, not an end surface but a side portion of the regulating portion is received in the regulated portion.

The connector according to the present invention is configured as described above so that the regulating portion may be easily inserted into the regulated portion when the side portion of the regulating portion is formed to have a large size relative to the regulated portion in the intersecting direction. Moreover, the regulating portion, which is received in the regulated portion, may be stably held, for example, when the regulating portion is formed to have the substantially same size as the regulated portion in a direction perpendicular to both the intersecting direction and the predetermined direction (i.e. a movement-regulation direction or a direction in which the movement of the regulated portion is intended to be regulated when the mated state is locked). According to the present invention, it is therefore possible to more securely lock the mated state with the mating connector.

An appreciation of the objectives of the present invention and a more complete understanding of its structure may be had by studying the following description of the preferred embodiment and by referring to the accompanying drawings.

DESCRIPTION OF EMBODIMENTS

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

As shown in FIGS. 1 to 4, a connector 100 according to an embodiment of the present invention is a power-supply plug. The connector 100 is mateable along the X-direction (mating direction) with a mating connector (power-receiving receptacle) 200 (see FIGS. 10 and 11) installed, for example, in an electric car.

Figure 10:
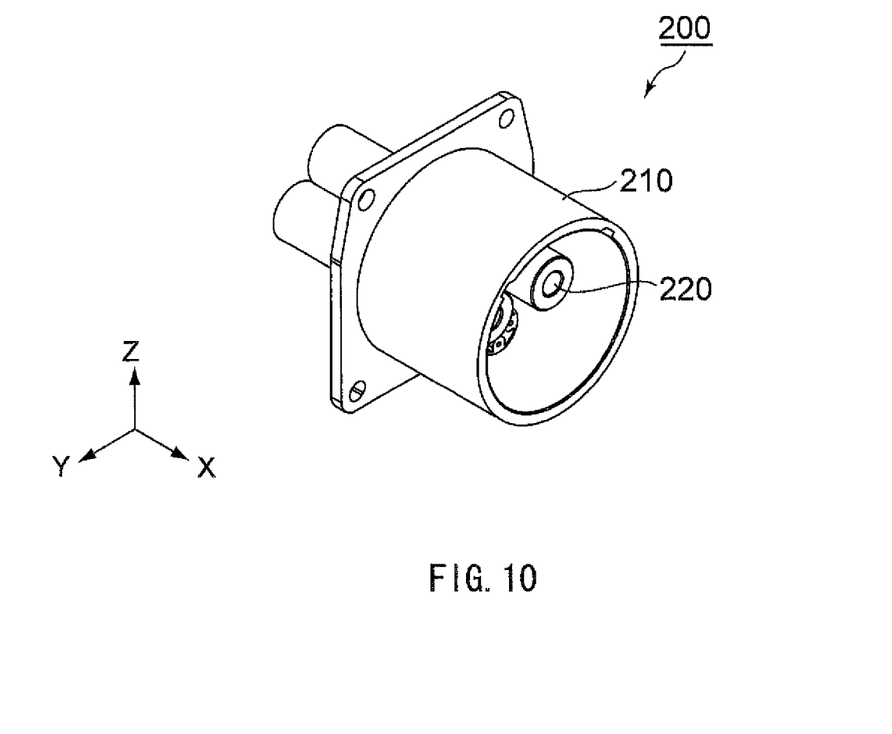
FIG. 10 is a perspective view showing a mating connector mateable with the connector of FIG. 1.
Figure 11:
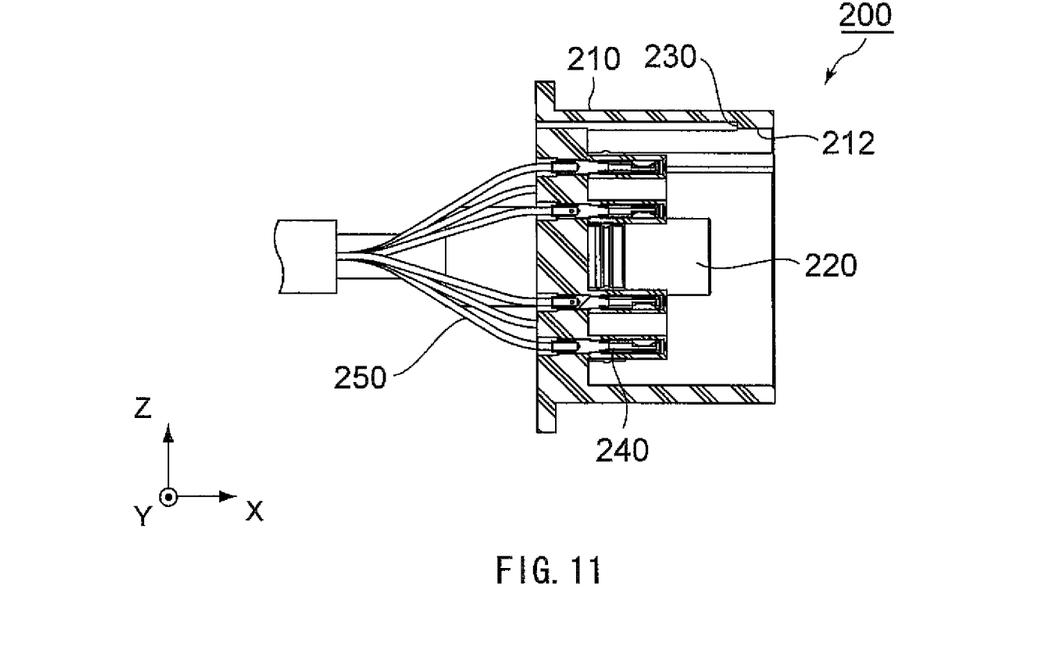
FIG. 11 is a cross-sectional view showing the mating connector of FIG. 10, taken along its central axis.

As shown in FIGS. 10 and 11, the mating connector 200 comprises a housing 210 made of an insulating material, a plurality of power receiving contacts 220 and a plurality of signal contacts 240. The power receiving contacts 220 and the signal contacts 240 are held by the housing 210. The signal contacts 240 are connected to signal lines 250, respectively. The mating connector 200 is further formed with an inner wall 212 and an engaging portion 230. The inner wall 212 is formed at the positive X-side end of the inside of the housing 210. The engaging portion 230 according to the present embodiment is a step which is formed inside of the housing 210 so as to be adjacent to the inner wall 212. In other words, the inner wall 212 protrudes from the engaging portion 230 toward a central axis of the housing 210.

As shown in FIGS. 1 to 4, the connector 100 according to the present embodiment comprises a housing 110 made of an insulating material, a plurality of signal contacts 120, a plurality of power supply contacts (not shown), a shell 130, a lock member (lock lever) 140, a release member (release lever) 150, a regulated portion 160, a solenoid 170, a regulating member 180 and a guide plate 190. The signal contacts 120 and the power supply contacts (not shown) are held by the housing 110. The shell 130 is an outer shell of the connector 100. The lock member 140 is configured to engage the mating connector 200 under a mated state where the connector 100 and the mating connector 200 are mated with each other (see FIG. 13), wherein an engagement of the lock member 140 locks the mated state. On the other hand, the release member 150 is operable to be moved to release the engagement of the lock member 140 with the mating connector 200 (see FIG. 14) so that the mated state is unlocked by the release member 150. The regulated portion 160 according to the present embodiment is formed on the release member 150. However, the regulated portion 160 may be formed on the other member. For example, the regulated portion 160 may be formed on the lock member 140. The solenoid 170 functions as an electronic lock which locks the release member 150 so that the release member 150 is unmovable. More specifically, the regulating member 180 is moved by the solenoid 170 under the mated state so that the regulating member 180 regulates a movement of the regulated portion 160. The guide plate 190 is configured to guide the regulating member 180, which is moved by the solenoid 170, toward the regulated portion 160.

The housing 110 has a roughly cylindrical shape extending along a central axis parallel to the X-direction so that the housing 110 has a negative X-side end (front end). The housing 110 is formed with holding holes 112 for holding the power supply contacts (not shown) and holding holes 114 for holding the signal contacts 120 (see FIG. 2). Each of the holding holes 112 and the holding holes 114 extends rearward from the front end (mating end) of the housing 110. The power supply contact (not shown) is configured to supply high electric current to the power receiving contact 220 which is connected thereto under the mated state. On the other hand, the signal contact 120 is configured to transmit signal to the signal contact 240 which is connected thereto under the mated state.

Figure 1:
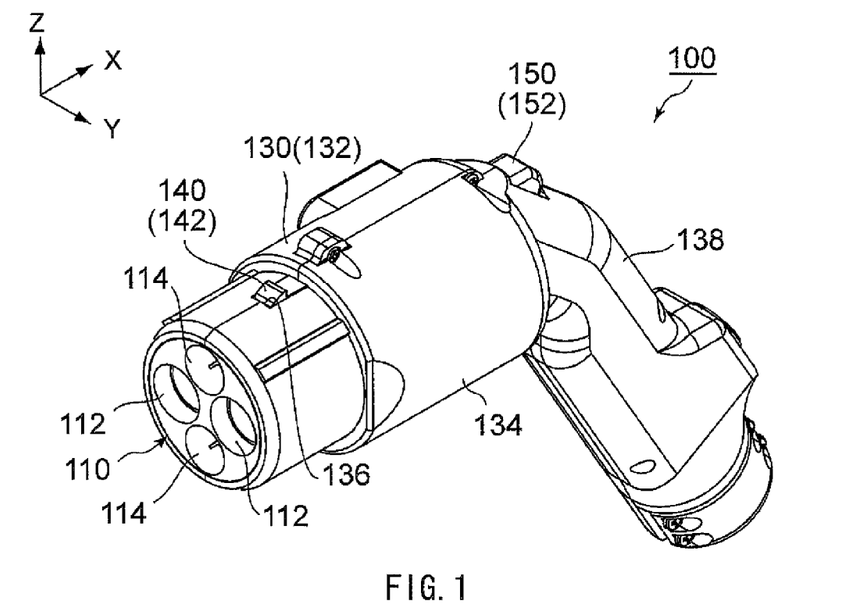
FIG. 1 is a perspective view showing a connector according to an embodiment of the present invention.
Figure 2:
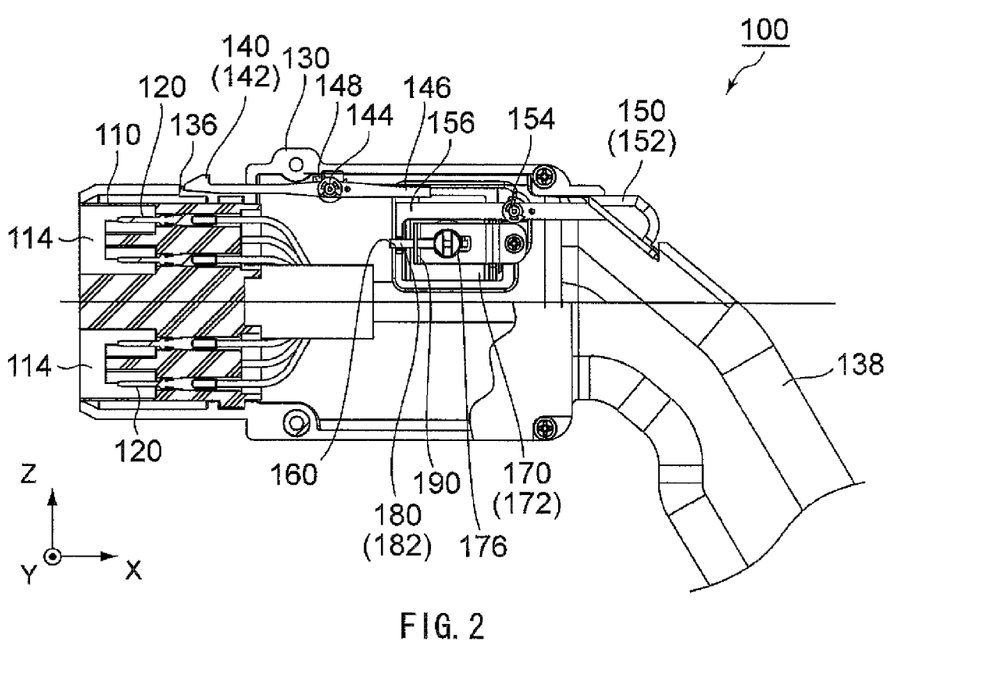
FIG. 2 is a partially cutaway, side view showing main portions of the connector of FIG. 1.

As shown in FIG. 1, the shell 130 includes a first shell 132 and a second shell 134 each having a half-pipe shape. The first shell 132 and the second shell 134 are connected to each other to form the shell 130. More specifically, according to the present embodiment, the second shell 134 is fixed to the first shell 132 by screwing. The shell 130 is dividable into the first shell 132 and the second shell 134 by a plane passing the central axis of the housing 110. As can be seen from FIGS. 2 to 4, when the connector 100 is assembled, the housing 110, which holds the signal contacts 120 and the power supply contacts (not shown), is installed in the first shell 132 together with the lock member 140, the release member 150, and the solenoid 170 attached with the regulating member 180. Then, the second shell 134 is attached to the first shell 132 so as to cover the aforementioned members from a lateral side. As shown in FIGS. 1 to 4, the shell 130 is formed with a hole 136. The hole 136 is provided at an inserted part of the shell 130, wherein the inserted part is inserted in the housing 210 of the mating connector 200 under the mated state. As shown in FIGS. 1 and 2, the connector 100 comprises a grip 138 configured to be held by an operator when the electric power is supplied. The grip 138 is formed behind the shell 130.

Figure 3:
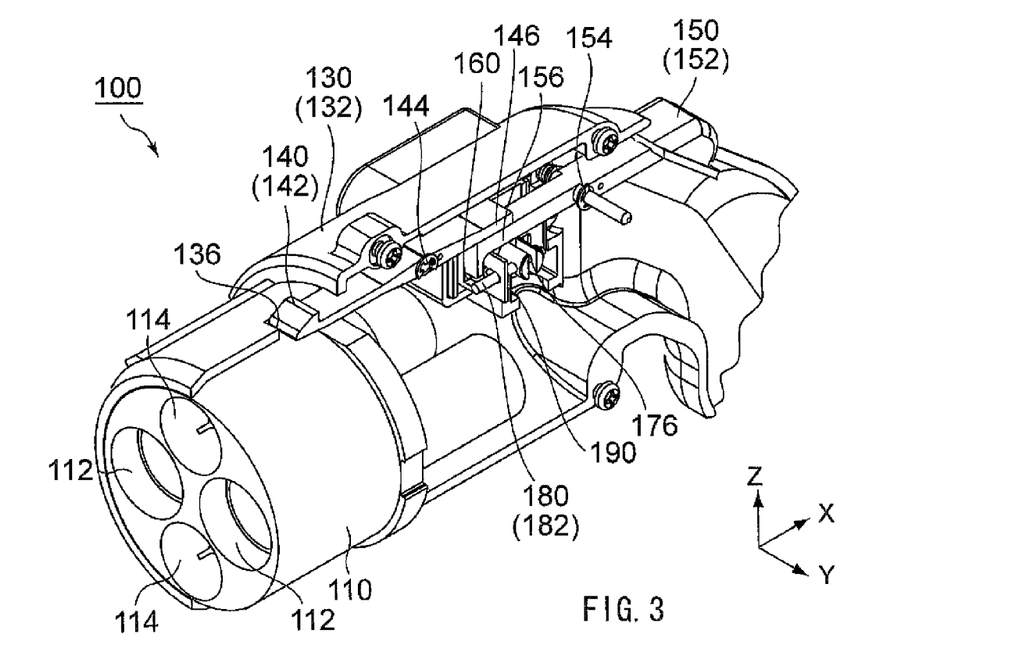
FIG. 3 is a perspective view showing the connector of FIG. 1 under a state where a plunger is located at a release position, wherein a second shell, power supply contacts (contacts), signal contacts (contacts) and cables connected to these contacts are removed from the connector.
Figure 4:
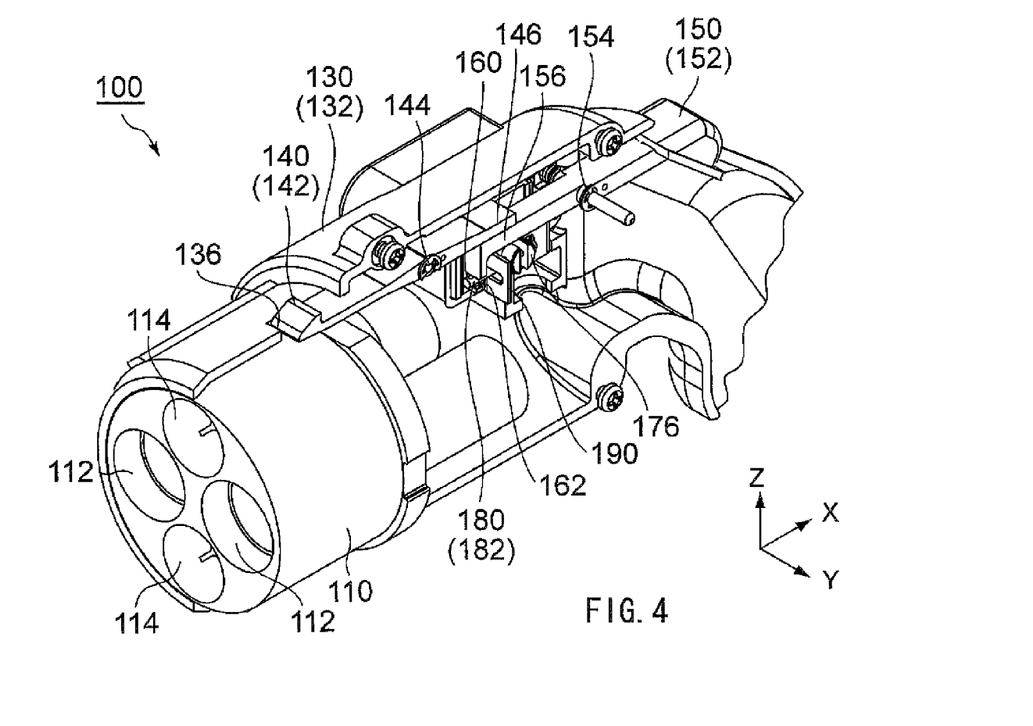
FIG. 4 is a perspective view showing the connector of FIG. 3 under a state where the plunger is located at a regulating position.

As shown in FIGS. 2 to 4, the lock member 140 has a lock portion 142, an axis 144 and a pressed portion 146. The lock member 140 is held by the shell 130 so as to be pivotable on the axis 144. The lock portion 142 is configured to lock the mated state of the connector 100 with the mating connector 200. In detail, the lock member 140 has a front end (i.e. negative X-side end) and a rear end (i.e. positive X-side end) on opposite ends in the X-direction, respectively. The lock portion 142 is formed on the front end of the lock member 140 and has a hook-like shaped cross-section which is formed so as to protrude upward. The lock member 140 is attached with a spring 148. The spring 148 constantly urges the lock portion 142 upward so that the lock portion 142 protrudes upward over the hole 136. The hook of the lock portion 142, which passes through the hole 136 of the shell 130, is engaged with the engaging portion 230 of the mating connector 200 under the mated state so that the mated state is locked (see FIGS. 2 and 13). The pressed portion 146 is formed on the rear end of the lock member 140 while the axis 144 is located between the lock portion 142 and the pressed portion 146 in the X-direction. As can be seen from the above description, when the pressed portion 146 is pushed to move upward, the lock portion 142 moves downward.

As shown in FIGS. 2 to 4, the release member 150 has an operated portion 152, a pivot 154 and a pressing portion 156. The release member 150 is held by the shell 130 so as to be pivotable on the pivot 154. The release member 150 has a front end (i.e. negative X-side end) and a rear end (i.e. positive X-side end) on opposite ends in the X-direction, respectively. The operated portion 152 is formed on the rear end of the release member 150. The operated portion 152 protrudes outward from the shell 130 to be located at a top part of the grip 138 so that the operated portion 152 is operable to be pressed by the operator. The pressing portion 156 is formed on the front end of the release member 150. In other words, the release member 150 has the front end which functions as the pressing portion 156. The pivot 154 is located between the operated portion 152 and the pressing portion 156 in the X-direction. As can be seen from the above description, when the operated portion 152 is pressed to move downward, the pressing portion 156 moves upward. The pressing portion 156 according to the present embodiment is located under the pressed portion 146. Accordingly, when the operated portion 152 is operated to be moved downward, the pressing portion 156 presses the pressed portion 146 upward. As a result, the lock portion 142 moves downward so that the engagement of the lock member 140 with the mating connector 200 is released (i.e. the mated state is unlocked).

The front end of the release member 150 according to the present embodiment extends along the negative Z-direction so that the front end is formed with an downward extending portion. The downward extending portion is formed with a regulated portion 160. The regulated portion 160 according to the present embodiment is a recess which is recessed in the negative Y-direction. It is possible to regulate a movement of the pressing portion 156 in the Z-direction by regulating a movement of the regulated portion 160 in the Z-direction. The regulated portion 160 according to the present embodiment is located at a position which is nearer to the pressing portion 156 than the pivot 154. In other words, a distance between the regulated portion 160 and the pressing portion 156 is shorter than a distance between the regulated portion 160 and the pivot 154. More specifically, the pressing portion 156 according to the present embodiment is located between the regulated portion 160 and the pivot 154 in the X-direction. Accordingly, a relatively small force applied to the regulated portion 160 is able to regulate the movement of the pressing portion 156 in the Z-direction.

Figure 8:
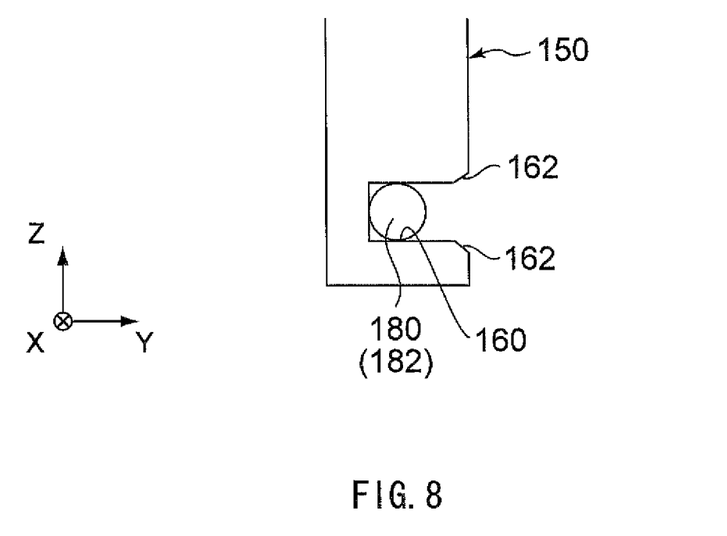
FIG. 8 is a front view showing a regulated portion and the regulating member of the connector of FIG. 4.

The regulated portion 160 according to the present embodiment is provided so that the mated state is unlocked by a movement of the regulated portion 160 along the Z-direction (movement-regulation direction). When the movement of the regulated portion 160 in the Z-direction is regulated, the movement of the pressing portion 156 along the positive Z-direction (i.e. the elevation of the pressing portion 156) is regulated so that the mated state is prevented from being unlocked. According to the present embodiment, the connector 100 further comprises guide portions 162. In detail, as shown in FIG. 8, the regulated portion 160 according to the present embodiment is a space surrounded by a vertical wall, a top wall and a bottom wall. The top wall and the bottom wall face each other in the Z-direction. The positive Y-side edges of the top wall and the bottom wall are beveled so that the regulated portion 160 is formed with the guide portions 162. Each of the guide portions 162 extends obliquely to both the Y-direction (predetermined direction) and the Z-direction.

Figure 5:
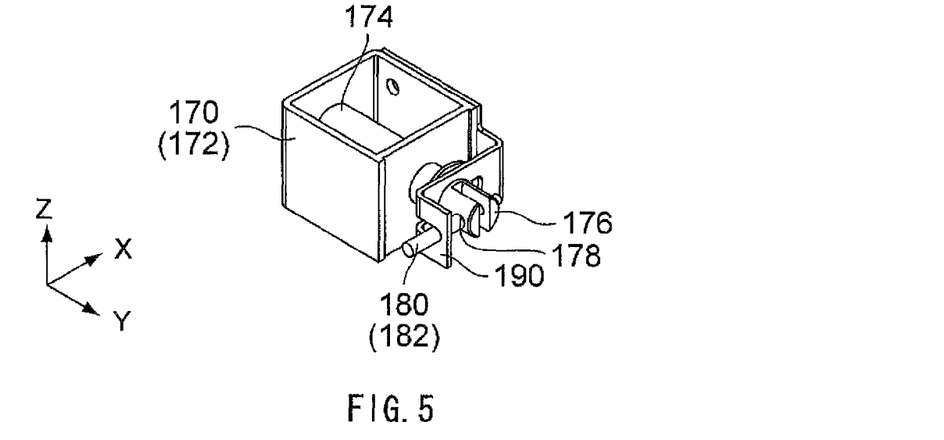
FIG. 5 is a perspective view showing a unit consisting of a solenoid, a regulating member and a guide plate of the connector of FIG. 1 under the state where the plunger is located at the release position.
Figure 6:
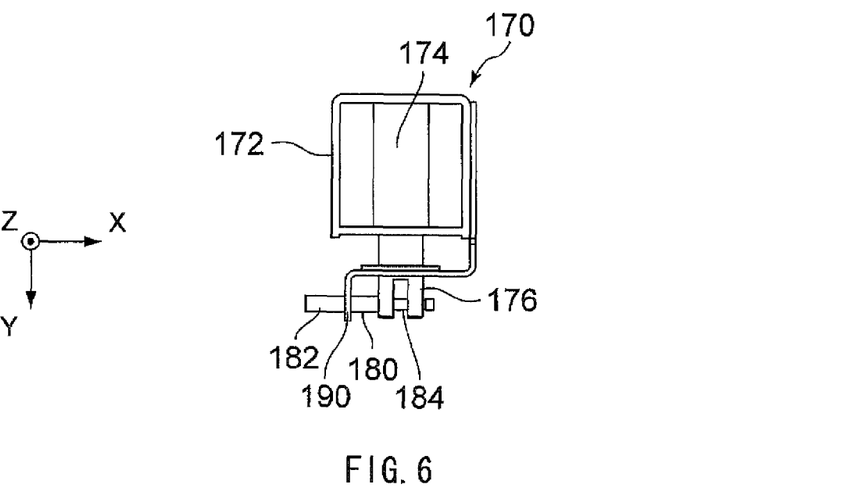
FIG. 6 is a top view showing the unit of FIG. 5.
Figure 7:
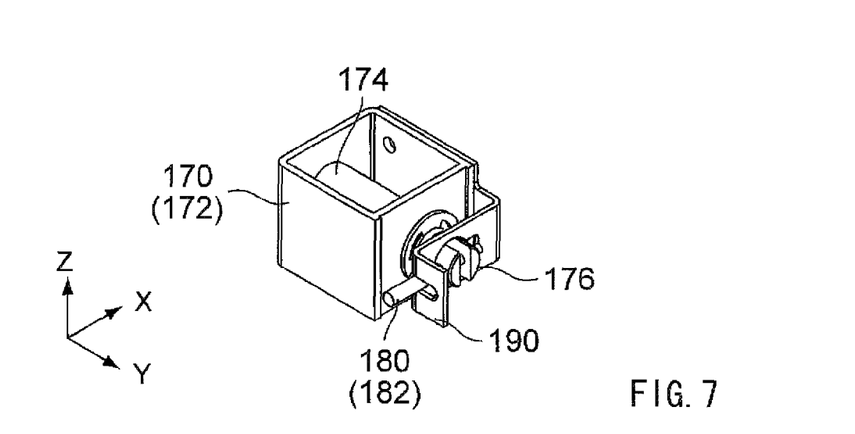
FIG. 7 is a perspective view showing the unit of FIG. 5 under the state where the plunger is located at the regulating position.

As shown in FIGS. 5 to 7, the solenoid 170 has a frame 172, a magnet coil 174 and a plunger 176. The solenoid 170 is configured to drive the plunger 176 between a regulating position (see FIGS. 4 and 7) and a release position (see FIGS. 3, 5 and 6) along the Y-direction. More specifically, the magnet coil 174 is held by the frame 172 so as to receive an electric current (i.e. to be activated) while the connector 100 supplies the electric power to the mating connector 200. The magnet coil 174, which is activated, drives the plunger 176 between the regulating position and the release position along the Y-direction. The solenoid 170 according to the present embodiment is a so-called pull-type solenoid. The release position of the plunger 176 is located outward from the regulating position in the Y-direction. In other words, as comparing with the plunger 176 located at the regulating position, the plunger 176 located at the release position protrudes outward in the Y-direction. On the other hand, the plunger 176 located at the regulating position stays inward in the Y-direction. Accordingly, it is possible to install all the members related to the lock of the mated state (for example, the lock member 140, the release member 150 and the solenoid 170) into the first shell 132, and to put the aforementioned members in a state where they are activatable without the second shell 134. In other words, the connector 100 according to the present embodiment is provided with no structure which is activatable only when the first shell 132 and the second shell 134 are connected to each other. The connector 100 with the pull-type solenoid is assemblable by covering the first shell 132, into which the members related to the lock of the mated state are installed, with the second shell 134. Therefore, the connector 100 may be more easily assembled. In addition, a pull-type solenoid is more popular and available than a so-called push-type solenoid.

As shown in FIG. 5, the plunger 176 is formed with a holding hole 178 which pierces the plunger 176 along the X-direction (intersecting direction). The regulating member 180 is inserted in and supported by the holding hole 178. In detail, the regulating member 180 according to the present embodiment has a regulating portion 182 and a held portion 184 each extending in the X-direction so that the regulating member 180 has a pin-like shape extending in the X-direction. The held portion 184 is inserted in and held by the holding hole 178 (see FIGS. 5 and 6). According to the present embodiment, an extending direction in which the regulating member 180 extends (i.e. a piercing direction in which the holding hole 178 piercing the plunger 176) is perpendicular to the Y-direction. In other words, the intersecting direction (X-direction) intersects with the predetermined direction (Y-direction) at right angles. However, the extending direction (the piercing direction) may not be perpendicular to the Y-direction, provided that the extending direction intersects with the Y-direction.

As shown in FIG. 8, the regulating portion 182 according to the present embodiment has a circular cross-section in the YZ-plane. The diameter of the circular cross-section of the regulating portion 182 is substantially same as the size of the regulated portion 160 in the Z-direction (movement-regulation direction). As shown in FIGS. 3 to 7, the regulating member 180 extends in the X-direction while supported by the plunger 176. In the X-direction, the size of a part which is workable as the regulating portion 182 of the regulating member 180 is larger than the size of the regulated portion 160.

The regulating member 180 is driven by the plunger 176 to move along the Y-direction. In other words, the regulating member 180 is supported by the plunger 176 so as to be moved by the plunger 176. In general, the plunger 176 driven by the solenoid 170 may rotate about its axis, which extends in the Y-direction, while moving along the Y-direction. Accordingly, the regulating member 180 supported by the plunger 176 may pivot on the plunger 176. According to the present embodiment, the guide plate 190 is provided so that the regulating portion 182 of the regulating member 180 stably moves along the Y-direction. In other words, the guide plate 190 guides the regulating portion 182 along the Y-direction when the plunger 176 driven by the solenoid 170 moves the regulating portion 182.

As shown in FIG. 3, when the plunger 176 is located at the release position, the regulating member 180 is apart from the regulated portion 160. Accordingly, when the plunger 176 is located at the release position, the regulating portion 182 of the regulating member 180 does not interfere with the movement of the regulated portion 160. The regulated portion 160 is configured to receive the regulating portion 182 along the Y-direction when the plunger 176 is driven from the release position to the regulating position (see FIG. 4). More specifically, when the plunger 176 is driven, not an end surface of the regulating portion 182 in the X-direction but a side surface of the regulating portion 182 is received into the regulated portion 160. According to the present embodiment, the release member 150 is provided with the guide portion 162 oblique to both the Y-direction and the Z-direction so that the regulating portion 182 is guided by the guide portion 162 to be received into the regulated portion 160 even if the position of the regulating portion 182 in the Z-direction is a little above or below the position of the regulated portion 160 in the Z-direction. In other words, the guide portion 162 is configured so that the regulating portion 182 is guided by the guide portion 162 to be received in the regulated portion 160. According to the present embodiment, the mated state is securely preventable from being unlocked even if the position of the regulating portion 182 in the Z-direction is not accurately adjusted to the position of the regulated portion 160 in the Z-direction. In detail, when the plunger 176 is located at the regulating position, the regulating portion 182 received in the regulated portion 160 regulates a movement of the release member 150 so that the release member 150 becomes inoperable to be moved. As can be seen from the above description, the regulating portion 182 according to the present embodiment indirectly prevents the mated state from being unlocked. Moreover, if the regulated portion 160 is provided at the lock member 140, it is possible to directly prevent the mated state from being unlocked. In other words, the movement of the regulated portion 160 is regulated by the regulating portion 182 when the plunger 176 is located at the regulating position so that the regulated portion 160 directly or indirectly prevents the mated state from being unlocked (i.e. prevents the lock by the lock member 140 from being released).

As previously described, the regulating portion 182 according to the present embodiment is longer than the regulated portion 160 in the X-direction so that the regulated portion 160 more surely receives the regulating portion 182. Moreover, the regulating portion 182 has the substantially same size as the regulated portion 160 in the Z-direction so that the regulated portion 160 more stably holds the regulating portion 182 which is received therein. In other words, the size and the shape in the Z-direction of the regulating portion 182 according to the present embodiment are designed so as to effectively prevent the movement of the regulated portion 160 along the Z-direction under a state where the regulating portion 182 is received in the regulated portion 160.

Figure 9:
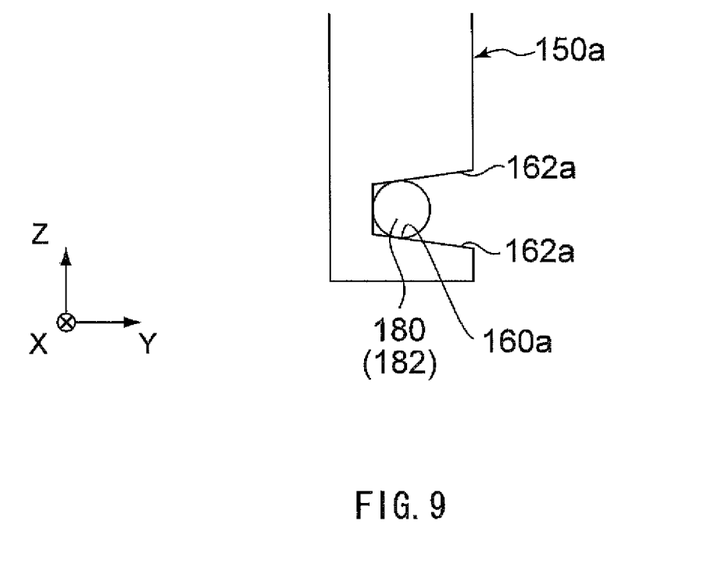
FIG. 9 is a front view showing a modification of the regulated portion of FIG. 8.

As shown in FIG. 8, the height (i.e. the size in the Z-direction) of the regulated portion 160 according to the present embodiment is constant along the Y-direction. However, the height of the regulated portion 160 may be varied along the Y-direction. For example, as shown in FIG. 9, the connector 100 may comprise a release member 150a instead of the release member 150. The release member 150a has guide portions 162a facing each other in the Z-direction. Each of the guide portions 162a is a slope oblique to both the Y-direction and the Z-direction. The release member 150a is formed with a recess which functions as a regulated portion 160a. In detail, the regulated portion 160a is a recess located between two slopes each extending continuously from the guide portion 162a. The regulated portion 160a is formed so that the size of the regulated portion 160a in the Z-direction gradually becomes smaller as the position in the Y-direction is nearer to the inner wall of the regulated portion 160a. Thus configured regulated portion 160a may securely hold the regulating member 180 even if the diameter of the regulating member 180 is changed, for example, by design-change. Accordingly, the regulated portion 160a may more properly prevent the lock of the mated state from being released (i.e. prevent the mated state from being unlocked).

Hereinafter, referring to FIGS. 12 to 14, it is described about how the connector 100 is mated with the mating connector 200 and how the connector 100 is removed from the mating connector 200.

Figure 12:
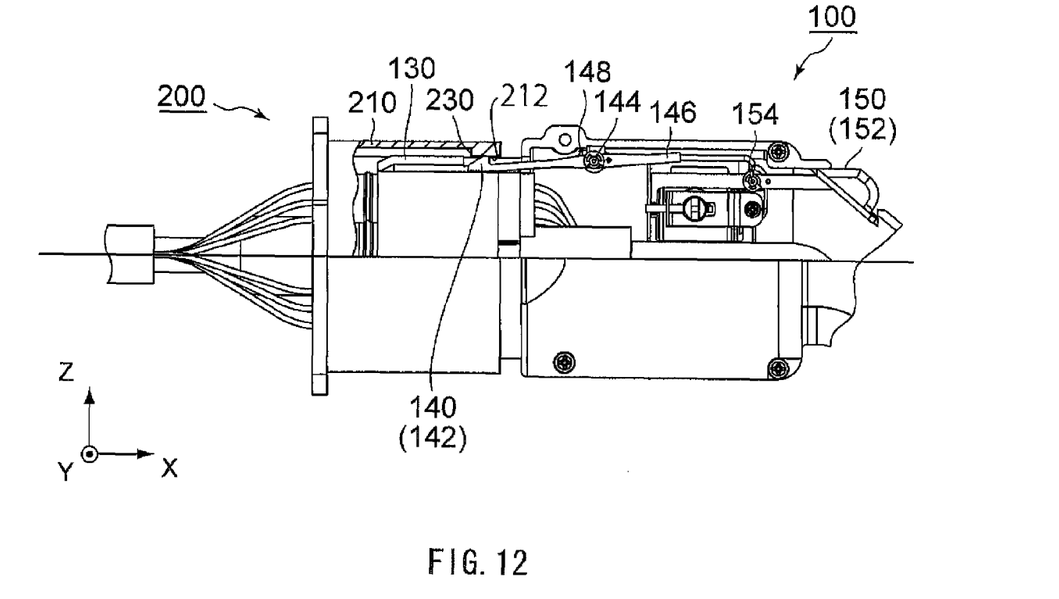
FIG. 12 is a partially cutaway, side view showing the connector of FIG. 1 and the mating connector of FIG. 10, wherein the connector and the mating connector are in a mating process.

As shown in FIG. 12, when the connector 100 is inserted into the mating connector 200, the lock portion 142 of the lock member 140 receives a downward force from the mating connector 200. Accordingly, the lock portion 142 is moved downward from its initial position while resisting an upward force applied from the spring 148. The lock portion 142 is moved to the inside of the housing 210 to slide on the inner wall 212 of the housing 210.

Figure 13:
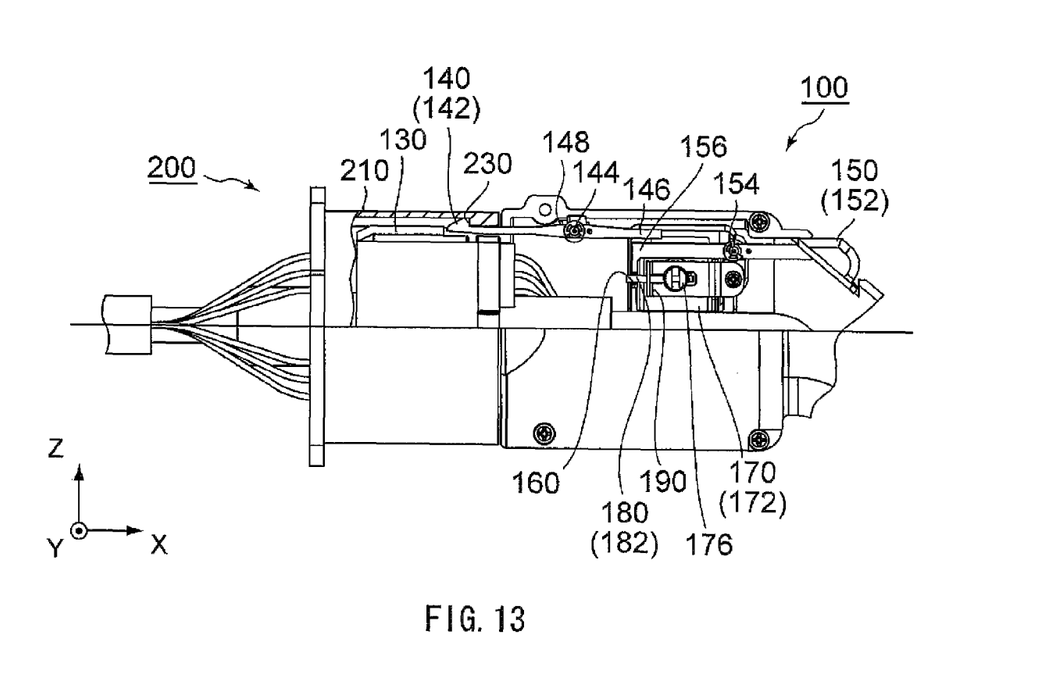
FIG. 13 is a partially cutaway, side view showing the connector of FIG. 1 and the mating connector of FIG. 10, wherein the connector and the mating connector are mated with each other.
Figure 14:
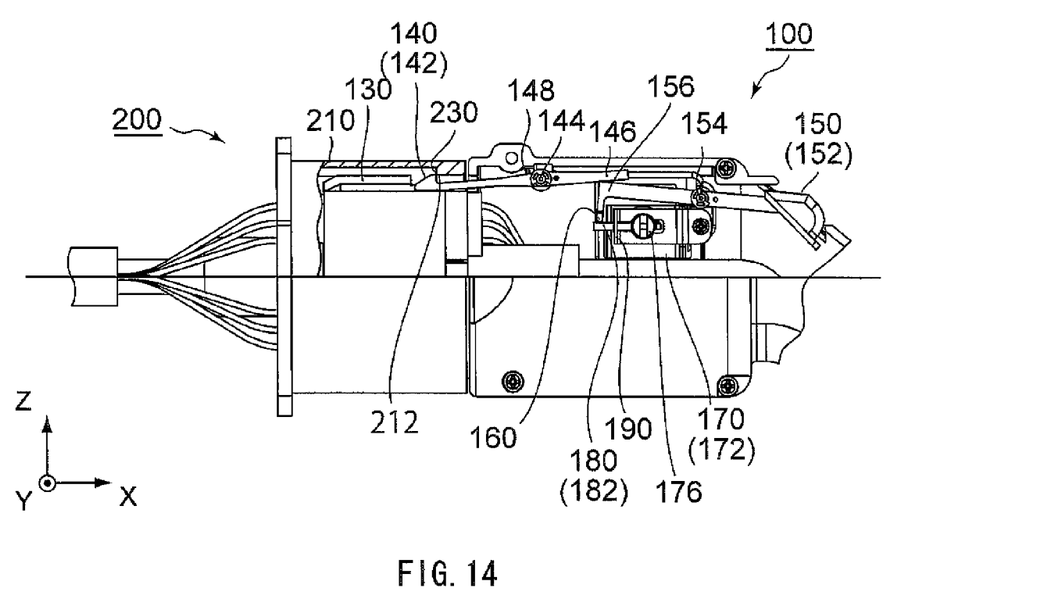
FIG. 14 is a partially cutaway, side view showing the connector of FIG. 1 and the mating connector of FIG. 10, wherein the connector and the mating connector are in a removing process.

As shown in FIG. 13, when the connector 100 is further inserted into the mating connector 200, the connector 100 and the mating connector 200 are completely mated each other. In other words, the connector 100 and the mating connector 200 are transferred to the mated state. Under the mated state, the lock portion 142 arrives at the engaging portion 230 beyond the inner wall 212 in the X-direction. The lock portion 142 is urged upward by the spring 148 to return to the initial position. When the lock portion 142 is located at the initial position under the mated state, the mated state is locked. In detail, even if the connector 100 is pulled from the mating connector 200, the lock portion 142 is engaged with the engaging portion 230 so that the connector 100 is unable to be removed from the mating connector 200. Moreover, the solenoid 170 is activated under the mated state so that the plunger 176 is driven to the regulating position by the solenoid 170. The regulating portion 182 held by the plunger 176 is received in the regulated portion 160 (or the regulated portion 160a) so that the movement of the release member 150 is regulated. As can be seen from the above description, even if the release member 150 is accidentally operated while the electric power is supplied to the mating connector 200, the mated state is not unlocked.

When the power supply is stopped (for example, when the mating connector 200 is fully charged), the solenoid 170 is deactivated so that the plunger 176 returns to the release position. The regulating portion 182 comes off the regulated portion 160 (or the regulated portion 160a) so that the release member 150 becomes operable to be moved (i.e. the mated state becomes unlockable). When the release member 150 is moved under a state where the plunger 176 is located at the release position, the engagement of the lock member 140 with the mating connector 200 is released. In detail, when the operated portion 152 is pressed downward, the pressing portion 156 presses the pressed portion 146 upward so that the lock portion 142 moves downward. The engagement of the lock portion 142 with the engaging portion 230 is released so that the connector 100 is removable from the mating connector 200.

According to the embodiment described above, the mating direction is the X-direction and the predetermined direction is the Y-direction perpendicular to the mating direction. However, the relation between the mating direction and the predetermined direction is not limited to the embodiment described above. For example, the mating direction and the predetermined direction may be in parallel to each other.

Moreover, according to the embodiment described above, the plunger 176 and the regulating member 180 are members separated from each other. However, the plunger 176 and the regulating member 180 may be formed integrally.

The present application is based on a Japanese patent application of JP2011-14781 filed before the Japan Patent Office on Jan. 27, 2011, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST 100 connector (power-supply plug)
110 housing
112 holding hole
114 holding hole
120 signal contact
130 shell
132 first shell
134 second shell
136 hole
138 grip
140 lock member (lock lever)
142 lock portion
144 axis
146 pressed portion
148 spring
150,150a release member (release lever)
152 operated portion
154 pivot
156 pressing portion
160,160a regulated portion
162,162a guide portion
170 solenoid
172 frame
174 magnet coil
176 plunger
178 holding hole
180 regulating member
182 regulating portion
184 held portion
190 guide plate
200 mating connector (power-receiving receptacle)
210 housing
212 inner wall
220 power receiving contact
230 engaging portion
240 signal contact
250 signal line

The invention claimed is:

1. A connector mateable with a mating connector, the connector comprising:
a lock member configured to engage the mating connector under a mated state where the connector and the mating connector are mated with each other, an engagement of the lock member locking the mated state;
a solenoid having a plunger, the solenoid being configured to drive the plunger between a regulating position and a release position along a predetermined direction;
a regulating member having a regulating portion extending in an intersecting direction perpendicular to the predetermined direction, the regulating member being supported by the plunger so as to be moved by the plunger;
a regulated portion configured to receive the regulating portion along the predetermined direction when the plunger is driven from the release position to the regulating position, a movement of the regulated portion being regulated by the regulating portion when the plunger is located at the regulating
position so that the regulated portion directly or indirectly prevents the mated state from being unlocked;
a release member operable to be moved to release the engagement of the lock member with the mating connector; and
a guide plate formed with a channel, the channel of the guide plate guiding the regulating member along the predetermined direction when the plunger, which is driven by the solenoid, moves the regulating portion; and wherein:
the regulated portion is formed on the release member; and
when the plunger is located at the regulating position, the regulating portion is received in the regulated portion to regulate a movement of the release member so that the regulating portion indirectly prevents the mated state from being unlocked.

2. The connector as recited in claim 1, wherein:
the regulated portion is provided so that the mated state is unlocked by a movement of the regulated portion along a movement-regulation direction perpendicular to both the predetermined direction and the intersecting direction; and
a size and a shape of the regulating portion in the movement-regulation direction are designed so as to prevent the movement of the regulated portion along the movement-regulation direction under a state where the regulating portion is received in the regulated portion.

3. The connector as recited in claim 1, wherein:
the solenoid is a pull-type solenoid; and
as comparing with the plunger located at the regulating position, the plunger located at the release position protrudes outward in the predetermined direction.

4. The connector as recited in claim 1, the connector further comprising a guide plate, the guide plate guiding the regulating member along the predetermined direction when the plunger, which is driven by the solenoid, moves the regulating portion.

5. The connector as recited in claim 1, wherein the regulated portion is a recess which is recessed in the predetermined direction.

6. The connector as recited in claim 5, the connector further comprising a guide portion, the guide portion being configured so that the regulating portion is guided by the guide portion to be received in the regulated portion.

7. The connector as recited in claim 5 wherein:
the plunger is formed with a holding hole which pierces the plunger along the intersecting direction; and
the regulating member is inserted in and supported by the holding hole.

8. The connector as recited in claim 5, wherein the regulating member has a pin-like shape.

9. A connector mateable with a mating connector, the connector comprising:
a lock member configured to engage the mating connector under a mated state where the connector and the mating connector are mated with each other, an engagement of the lock member locking the mated state;
a solenoid having a plunger, the solenoid being configured to drive the plunger between a regulating position and a release position along a predetermined direction;
a regulating member having a regulating portion extending in an intersecting direction perpendicular to the predetermined direction, the regulating member being supported by the plunger so as to be moved by the plunger;
a regulated portion configured to receive the regulating portion along the predetermined direction when the plunger is driven from the release position to the regulating position, a movement of the regulated portion being regulated by the regulating portion when the plunger is located at the regulating position so that the regulated portion directly or indirectly prevents the mated state from being unlocked; and
a guide plate formed with a channel, the channel of the guide plate guiding the regulating member along the predetermined direction when the plunger, which is driven by the solenoid, moves the regulating portion.

10. The connector as recited in claim 9, the connector further comprising a release member operable to be moved to release the engagement of the lock member with the mating connector, wherein:
the regulated portion is formed on the release member; and
when the plunger is located at the regulating position, the regulating portion is received in the regulated portion to regulate a movement of the release member so that the regulating portion indirectly prevents the mated state from being unlocked.

11. The connector as recited in claim 10, the connector further comprising a shell wherein:
the lock member has an axis, a lock portion and a pressed portion, the lock member being supported by the shell so as to be pivotable on the axis;
the axis is located between the lock portion and the pressed portion;
the release member has a pivot, an operated portion and a pressing portion, the release member being supported by the shell so as to be pivotable on the pivot;
the pivot is located between the operated portion and the pressing portion;
a distance between the regulated portion and the pressing portion is shorter than a distance between the regulated portion and the pivot; and
the pressing portion presses the pressed portion when the release member is operated so that the engagement of the lock member with the mating connector is released.

* * * * *